(12) United States Patent
Macinnes et al.

(10) Patent No.: US 9,729,707 B2
(45) Date of Patent: Aug. 8, 2017

(54) METHOD AND SYSTEM TO MANAGE PERSONALIZED VEHICLE USER INFORMATION

(71) Applicant: GM GLOBAL TECHNOLOGY OPERATIONS LLC, Detroit, MI (US)

(72) Inventors: Roddi L. Macinnes, Thornhill (CA); Amanda J. Kalhous, Ajax (CA); Neeraj R. Gautama, Whitby (CA); Jarvis Chau, Markham (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 78 days.

(21) Appl. No.: 14/587,581

(22) Filed: Dec. 31, 2014

(65) Prior Publication Data

US 2016/0191704 A1 Jun. 30, 2016

(51) Int. Cl.
| | |
|---|---|
| *G06F 7/04* | (2006.01) |
| *H04L 29/06* | (2006.01) |
| *H04L 9/32* | (2006.01) |
| *G06F 21/00* | (2013.01) |
| *H04M 3/42* | (2006.01) |
| *H04W 8/20* | (2009.01) |
| *H04W 4/22* | (2009.01) |
| *H04L 29/08* | (2006.01) |
| *H04Q 9/00* | (2006.01) |

(52) U.S. Cl.
CPC ........ *H04M 3/42144* (2013.01); *H04L 67/12* (2013.01); *H04Q 9/00* (2013.01); *H04W 4/22* (2013.01); *H04W 8/20* (2013.01); *H04Q 2209/30* (2013.01)

(58) Field of Classification Search
CPC . H04M 3/42144; H04Q 9/00; H04Q 2209/30; H04W 4/22; H04W 8/20; H04L 67/12
USPC .......................... 726/2, 4; 713/165, 168, 182
See application file for complete search history.

(56) References Cited

U.S. PATENT DOCUMENTS

| | | | | |
|---|---|---|---|---|
| 2013/0176141 A1* | 7/2013 | LaFrance | ............... | G08C 17/02 340/870.02 |
| 2013/0340058 A1* | 12/2013 | Barnes | .................... | G06F 21/32 726/6 |

(Continued)

*Primary Examiner* — Aravind Moorthy
(74) *Attorney, Agent, or Firm* — Leydig, Voit & Mayer, Ltd.

(57) ABSTRACT

Implementations of the present invention contemplate utilizing the communicative connections between a telematics service provider (TSP), a communication device, and a telematics unit in a vehicle to manage personalized information of a subscriber. Implementations contemplate the removal of personalized information of a subscriber from data stores located at a vehicle, the uploading of personalized information of a subscriber to a database of an operations control center of the TSP, and the downloading of personalized information of a subscriber by a telematics unit of a vehicle from an operations control center of the TSP. Implementations enable personalized information of a subscriber to be removed from a vehicle remotely in order to prevent a user of the vehicle from accessing personalized information of the subscriber. Furthermore, implementations enable personalized information of a subscriber to be accessed by a vehicle in order to provide a subscriber with a customized experience in the vehicle.

19 Claims, 6 Drawing Sheets

(56) References Cited

U.S. PATENT DOCUMENTS

| | | | | |
|---|---|---|---|---|
| 2014/0302810 A1* | 10/2014 | Inha | ............... | H04W 4/005 |
| | | | | 455/404.1 |
| 2014/0310771 A1* | 10/2014 | Marshall | ............ | G06F 21/6218 |
| | | | | 726/2 |
| 2015/0178999 A1* | 6/2015 | Smith | ................ | G07C 5/008 |
| | | | | 701/31.5 |
| 2015/0379308 A1* | 12/2015 | Nakano | ............... | G06F 21/50 |
| | | | | 726/36 |

\* cited by examiner

| Personalized Vehicle Settings |
|---|
| Radio Presets |
| Audio Settings |
| Seat Positioning |
| Mirror Positioning |
| Climate Control Settings |
| Measurement Settings |
| Personalized User Information |
| Garage Door Codes |
| Voicemail Messages |
| Phone Numbers |
| Navigation Destinations |
| Email Messages |
| Email Contacts |
| Hands Free Call Minutes |
| Internet Browsing History |
| Multimedia Content |
| Applications |
| Application Data |
| Bluetooth Profiles |

FIG. 6

METHOD AND SYSTEM TO MANAGE PERSONALIZED VEHICLE USER INFORMATION

TECHNOLOGY FIELD

The present disclosure relates generally to vehicular telematics systems and more specifically to the use of a connection between a mobile device and a telematics unit within a vehicle to manage personal and private data used for customizing vehicle operations to the specifications of a specific vehicle user.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Once provisioned and activated, telematics units can be utilized by a subscriber to obtain telematics services, such as those described herein, from the TSP.

In order to receive customized telematics services, individual subscribers may input a variety of personalized data into a telematics unit or an associated control module of a vehicle. For example, individual subscribers may store a set of favorite radio stations at a particular geographic location, a phone number corresponding to a mobile phone, preferred climate control settings, a code used to open a garage door at a particular address, and various other information that enables the telematics unit or other control module of the vehicle to customize the services provided to a user of the vehicle. Once the personalized data is entered into the telematics unit or other control module by the user, the personalized data may be stored in a local memory of the telematics unit or the other control module. In addition to the local storage of personalized data at the telematics unit or the other control module, the TSP may store a variety of user-specific data corresponding to each subscriber at a centralized remote database, e.g. a database at an operations control center (OCC).

With the increasing popularity of vehicle sharing communities (e.g. Zipcar), the probability that a subscriber to telematics services provided by a TSP may use more than one vehicle has increased. Furthermore, the probability that an individual vehicle may be used by more than person has also increased. In such circumstances, the telematics unit of the vehicle may attempt to provide services to a user of a vehicle that are customized according to personalized data of a different user of the vehicle. Therefore, the services provided to the current user would not be optimized for that current user but instead for a previous user. Moreover, the current user of the vehicle may be able to access personalized data stored at the telematics unit by a previous user of the vehicle.

SUMMARY OF THE INVENTION

A system is provided for removing personalized information corresponding to a subscriber of a telematics service provider. The system includes a computerized communication device comprising a processor and processor readable media having stored thereon instructions for removing personalized information corresponding to the subscriber, the instructions providing for displaying a human machine interface (HMI) element that provides an option for requesting the removal of one or more data structures containing personalized information corresponding to the subscriber, receiving a selection of the option for requesting the removal of one or more data structures containing personalized information corresponding to the subscriber, transmitting a request to remove data representing personalized information corresponding to the subscriber. The system further includes a telematics unit located at a vehicle, the telematics unit comprising a processor and a processor readable media having stored thereon instructions for removing personalized information corresponding to the subscriber, the instructions providing for storing one or more data structures containing personalized information corresponding to the subscriber, receiving a request from the computerized communication device to remove data representing personalized information corresponding to the subscriber, and removing the data representing personalized information corresponding to the subscriber.

A method executed at a computerized communication device having a processor for managing personalized information corresponding to a subscriber of a telematics service provider is provided. The method includes displaying a human machine interface (HMI) element that provides an option for requesting the removal of one or more data structures containing personalized information corresponding to the subscriber, receiving a selection of the option for requesting the removal of one or more data structures containing personalized information corresponding to the subscriber, and transmitting a request to remove data representing personalized information corresponding to the subscriber.

A system is provided, the system comprising a telematics unit coupled to an in-vehicle network, the telematics unit including a control program coupled to the in-vehicle network, a first data deletion function responsive to the control program, and a first data structure having first user data erasable responsive to the first data deletion function; a first module coupled to the in-vehicle network including a second data deletion function responsive to the control program, and a second data structure having second user data erasable responsive to the second data deletion function; and a command input for the telematics unit for activating the control program to erase the first user data and the second user data.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6 is an example set of fields of a data structure storing personalized data of a vehicle user.

DETAILED DESCRIPTION OF THE DRAWINGS

Figure 1:
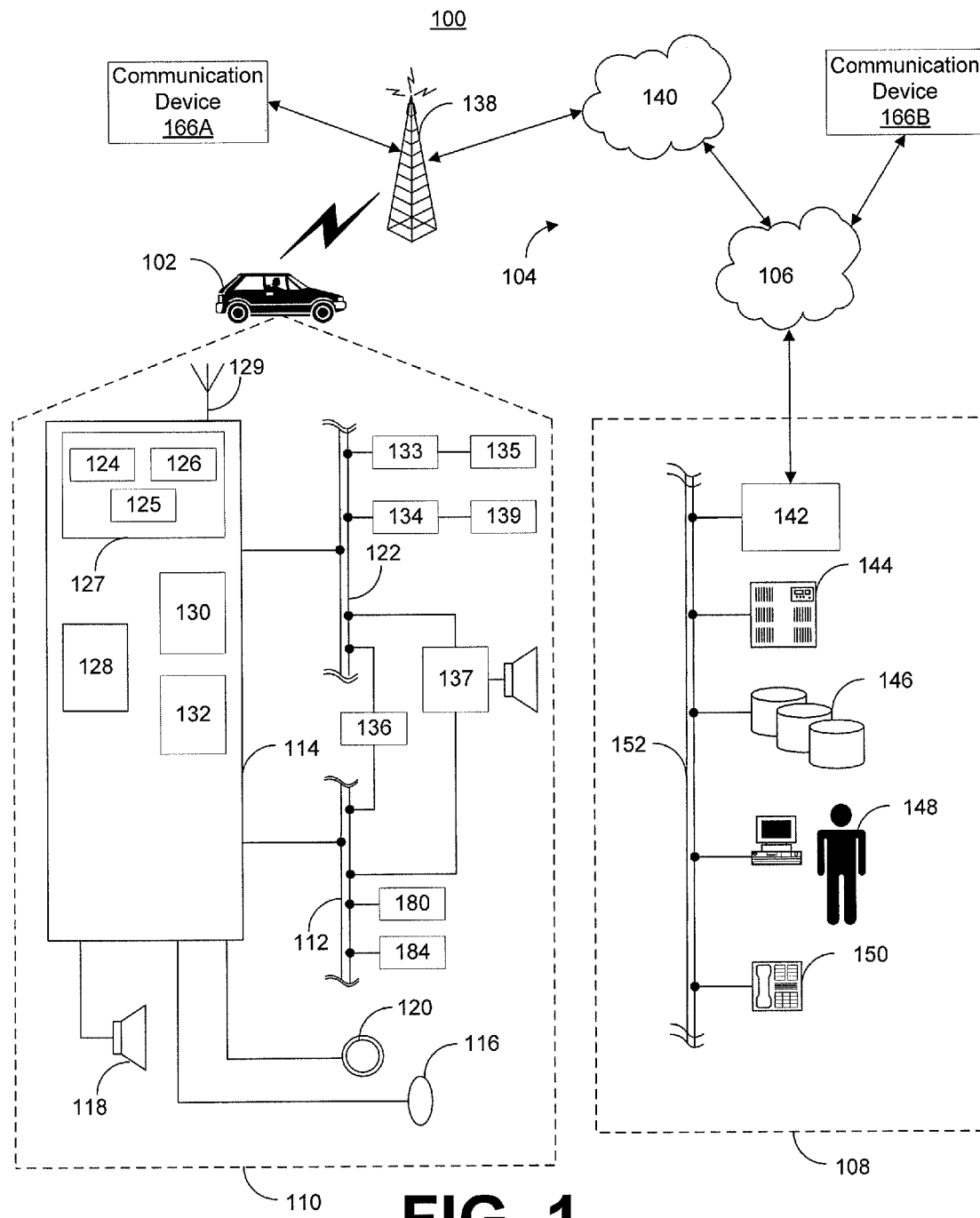
FIG. 1 is a schematic diagram of an operating environment for a mobile vehicle communication system usable in implementations of the described principles.

Implementations of the systems, methods, and hardware described herein contemplate providing for authorized management of personalized vehicle user data stored either locally at a vehicle, remotely at a database of a service provider, or both. Implementations contemplate a human-machine interface (HMI) that provides for the convenient management of personalized vehicle user data previously provided by a vehicle user or previously acquired from the vehicle user. The HMI can be provided at a vehicle having a telematics unit capable of establishing a communicative connection with an operations control center (OCC) of a telematics service provide (TSP), at a user equipment connected to the OCC of the TSP via a wireless wide area network (WWAN), or at a variety of other suitable locations for such an HMI.

Implementations also contemplate that the HMI that provides for the convenient management of personalized vehicle user data allows for the removal of personalized vehicle user data from the local memory of a vehicle. In some implementations, removal of personalized vehicle user data from the local memory of a vehicle requires that a vehicle key be connected to the vehicle during removal. Various implementations contemplate that the HMI provides for the selection of certain categories of personalized vehicle user data to be removed.

Implementations further contemplate the storage of personalized vehicle user data at a location remote from a vehicle at which the personalized vehicle user data was previously stored, entered, utilized, accessed, etc. For example, implementations contemplate providing an HMI that allows a user of a vehicle to select categories of information stored at a local memory of a vehicle for upload to a database of an OCC of a TSP. Additional implementations contemplate providing an HMI that allows a user of a vehicle to select categories of information stored at a database remote from a vehicle for downloading to the local memory of the vehicle. In some such implementations, download of personalized vehicle user data to the local memory of a vehicle requires that a vehicle key be connected to the vehicle during the download.

Implementations additionally contemplate an HMI that includes an element that allows a user to select an option to remove all personalized vehicle user data stored at a particular vehicle. In some such implementations, the element included in the HMI (or additional HMI elements) may require a user to enter any of additional information that identifies the particular vehicle, additional information that identifies a subscriber to whom the personalized vehicle user data that should be removed pertains, and additional information that identifies a location at which the personalized vehicle data that should be removed is stored. Furthermore, the element included in the HMI that allows a user to select the option to remove all personalized vehicle user data (or additional HMI elements) may require a user to enter verification and/or authentication information, e.g. a PIN or password.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that can be used with the present implementations and generally includes a vehicle 102, a wireless wide area network (WWAN) 104, a land network 106, and an operations control center (OCC) 108 of a telematics service provider (TSP). The communication system 100 further includes communication devices 166A and 166B. It should be appreciated that the overall architecture, setup and operation, as well as the individual components of a system such as that shown in FIG. 1 are generally known in the art. Thus, the following paragraphs provide a brief overview of one such example communication system 100. However, implementations could be carried out in other environments as well.

Vehicle 102 is a mobile vehicle such as a motorcycle, car, truck, recreational vehicle (RV), boat, plane, etc., and is equipped with suitable hardware and software that enables it to communicate over the communication system 100. The vehicle 102 includes vehicle hardware 110 that, as shown generally in FIG. 1, includes a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device capable of providing a variety of services through its communicative connection with the OCC 108 and generally includes an electronic processing device 128 that can include one or more application processors that each includes one or more processor cores, one or more types of electronic memory 130, a cellular chipset/component 124, a wireless modem 126, a dual mode antenna 129 (e.g. a radio frequency transceiver), and a navigation unit containing a GPS chipset/component 132. The GPS chipset/component is capable of determining the location of the vehicle with a high degree of accuracy. In one example, the wireless modem 126 comprises, and is carried out in the form of, a computer program and/or set of software routines executing within the electronic processing device 128. Alternatively, the wireless modem 126 comprises, and is carried out in the form of, a set of computer executable instructions stored at and carried out by the cellular chipset/component 124. The cellular chipset/component 124 and the wireless modem 126 can be called the network access device (NAD) 127 of the telematics unit 114. The NAD 127 further includes a short-range wireless unit 125 capable of communicating with a user's mobile device such as a cellular phone, tablet computer, PDA, or the like, over a short-range wireless protocol. For example, in one implementation, the short-range wireless unit 125 is a Bluetooth unit with an RF transceiver that communicates with a user's mobile device using Bluetooth protocol.

The telematics unit 114 provides a variety of services for subscribers. Examples of such services include: turn-by-turn directions and other navigation-related services provided in conjunction with the GPS based chipset/component 132;

airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions can further be provided on a display screen corresponding to the GPS component and/or through vocal directions provided through a vehicle audio component 137. It will be appreciated that the calculation-related processing can occur at the telematics unit or can occur at the OCC 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. Furthermore, the telematics unit 114 can include a number of components known by those skilled in the art in addition to those described above.

Vehicle communications use radio transmissions to establish a communications channel within the WWAN 104 so that voice and/or data transmissions occur over the communications channel. Vehicle communications are enabled via the cellular chipset/component 124 for voice communications and a wireless modem 126 for data transmission. To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the OCC 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the OCC 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is currently being charged), and the current rate at which the battery is being charged (e.g. as a rate of change of the percentage of capacity charged per unit time). The vehicle sensors 139 can also include but are not limited to gyroscopes, accelerometers, magnetometers, emission detection and/or control sensors, and the like. The sensor interface modules 134 can include power train control, climate control, and body control, to name but a few.

The vehicle sensor interface modules 134 and additional vehicle modules 184 form part of an in-vehicle module network. Such vehicle sensor interface modules 134 and additional vehicle modules 184 can be, e.g., electronic control units (ECUs) and can include but are not limited to an engine control module (ECM), a transmission control module (TCM), a powertrain control module (PCM), an electronic brake control module (EBCM), an anti-lock brake system (ABS) or a body control module (BCM), a door control unit (DCU), a seat control unit (SCU), and numerous other control modules that manage the various electronic systems in the vehicle. The vehicle sensor interface modules 134 and additional vehicle modules 184 that form part of the in-vehicle module network can locally store a variety of personalized vehicle user data. For example, individual modules may have a local memory at which personalized vehicle user data can be stored. In some implementations, a personalized vehicle user data control module 180 which includes a control program that is configured to identify personalized vehicle user data and data structures having stored thereat personalized vehicle user data and to delete all such personalized vehicle user data or a portion thereof. In some implementations, the personalized vehicle user data control module 180 is a component of the telematics unit 114. In alternative implementations, there is no distinct personalized vehicle user data control module 180 and the telematics unit 114 includes the control program that is configured to identify personalized vehicle user data and data structures having stored thereat personalized vehicle user data and to delete all such personalized vehicle user data or a portion thereof.

Communication devices 166A and 166B are capable of being communicatively connected to the OCC 108 and the vehicle hardware 110. Communication device 166A is connected to the OCC 108 and the vehicle hardware 110 through the WWAN 104, while communication device 166B is connected to the OCC 108 and the vehicle hardware 110 through land network 106 and the WWAN 104. The communication devices 166A and 166B can be any of a smart phone, a tablet computer, a personal digital assistant (PDA), a laptop computer, a desktop computer, or any other device capable of sending and receiving transmissions via a voice or data network. Communication devices 166A and 166B can be mobile devices that belong to one or more users of the vehicle 102 and can be equipped with Bluetooth units and RF transceivers that allow them to communicate with the vehicle telematics unit 114 via the short-range wireless unit 125 of the NAD 127.

The WWAN 104 can be a cellular telephone system or any other suitable wireless system that transmits signals between the vehicle hardware 110 and the land network 106. According to an example, the WWAN 104 includes one or more cell towers 138, base stations and/or mobile switching centers (MSCs) 140, as well as any other networking components required to connect the WWAN 104 with the land network 106. The mobile switching center can include a remote data server.

As appreciated by those skilled in the art, various cell tower/base station/MSC arrangements are possible and could be used with the WWAN 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The OCC 108 of the telematics service provider is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. Although the illustrated example has been described as it would be used in conjunction with a manned call center, it will be appreciated that the OCC 108 can be any central or remote facility, manned or unmanned, mobile or fixed, to or from which it is desirable to exchange voice and data.

The various components of the OCC 108 are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system and so that data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as the servers 144 and the databases 146. The telecommunication and computer equipment 150 includes hardware that provides a means by which the servers 144 can access the databases 146 in order to request information from the databases 146. Furthermore, the telecommunication and computer equipment 150 allows for the receipt and routing of requests from applications executing at the telematics unit 114 of the vehicle 102 or at one of the communication devices 166A and 166B. For example, the telecommunication and computer equipment 150 allows for the receipt and routing of signals that carry a request for the management of personalized information of an identifiable vehicle user from an application executing at the communication device 166B, which can be, e.g., a mobile device, such as a smart phone, of a user.

The servers 144 include a number of processors as well as computer readable storage media that have stored thereon processer executable instructions that provide routines that are specified by one or more server-side applications. For example, the servers 144 are configured to execute applications that enable the management of personalized vehicle user information stored on the server-side, e.g. at the databases 146, or at the client side, e.g. at the electronic storage media 130 of the telematics unit 114 of the vehicle 102. Such applications provide, e.g. routines by which the servers 144 can receive a request for management of personalized vehicle user information from an application executing on the communication device 166B, which can be, e.g., a desktop computer connected to the OCC 108 via the data network component of the land network 106.

The databases 146 include a number of high capacity electronic storage devices that can include RAM, ROM, PROM, volatile, nonvolatile, or other electronic memory. The databases 146 are configured to store subscription records and any other pertinent subscriber information. Implementations described herein contemplate that the databases 146 store a variety of personalized subscriber information that can be utilized to specify various settings for various components of the vehicle 102 in order to provide a customized experience to a particular subscriber that is or will be using the vehicle 102. Such personalized subscriber information can include one or more home, mobile, or business telephone numbers associated with a particular subscriber, a history of geographic locations that a particular subscriber has visited as reported by a vehicle navigation system, one or more codes for garage doors at residences or business to which a particular subscriber has access, identification information for one or more smart phones or other computerized devices associated with a particular subscriber record, application data for any of a number of processor executable applications installed on the telematics unit of a vehicle at the request of a particular subscriber, data collected by one or more electronic control units (ECUs) of a vehicle that is indicative of a driving mode preferred by a particular subscriber, radio station presets corresponding to various geographical regions as established by a particular subscriber, seat position information selected by a particular subscriber, and information corresponding to the registration of a particular subscriber with a particular TSP.

In general terms, not intended to limit the claims, the example environment depicted by FIG. 1 can be used by various hardware, systems, methods, and processes that utilize the communicative connections between the TSP (through the OCC 108) and one or both of the telematics unit 114 and a communication device selected form the group of communications devices 166A and 166B in order to manage personalized vehicle user data. Implementations contemplate the removal of personalized vehicle user information from the vehicle 102 (e.g. from the one or more types of electronic memory 130), the uploading of personalized vehicle user information to the OCC 108 (e.g. to the databases 146), the downloading of personalized vehicle information by the telematics unit 114, or various combinations thereof. Implementations also contemplate the removal of personalized vehicle user information from communication devices 166A and 166B and the removal of personalized vehicle user information from the OCC 108 (e.g. from the databases 146). Implementations contemplate that the management of the personalized vehicle user information is performed according to input provided to an HMI located at the vehicle 102, one of the communication devices 166A and 166B, or a combination thereof.

Figure 2:
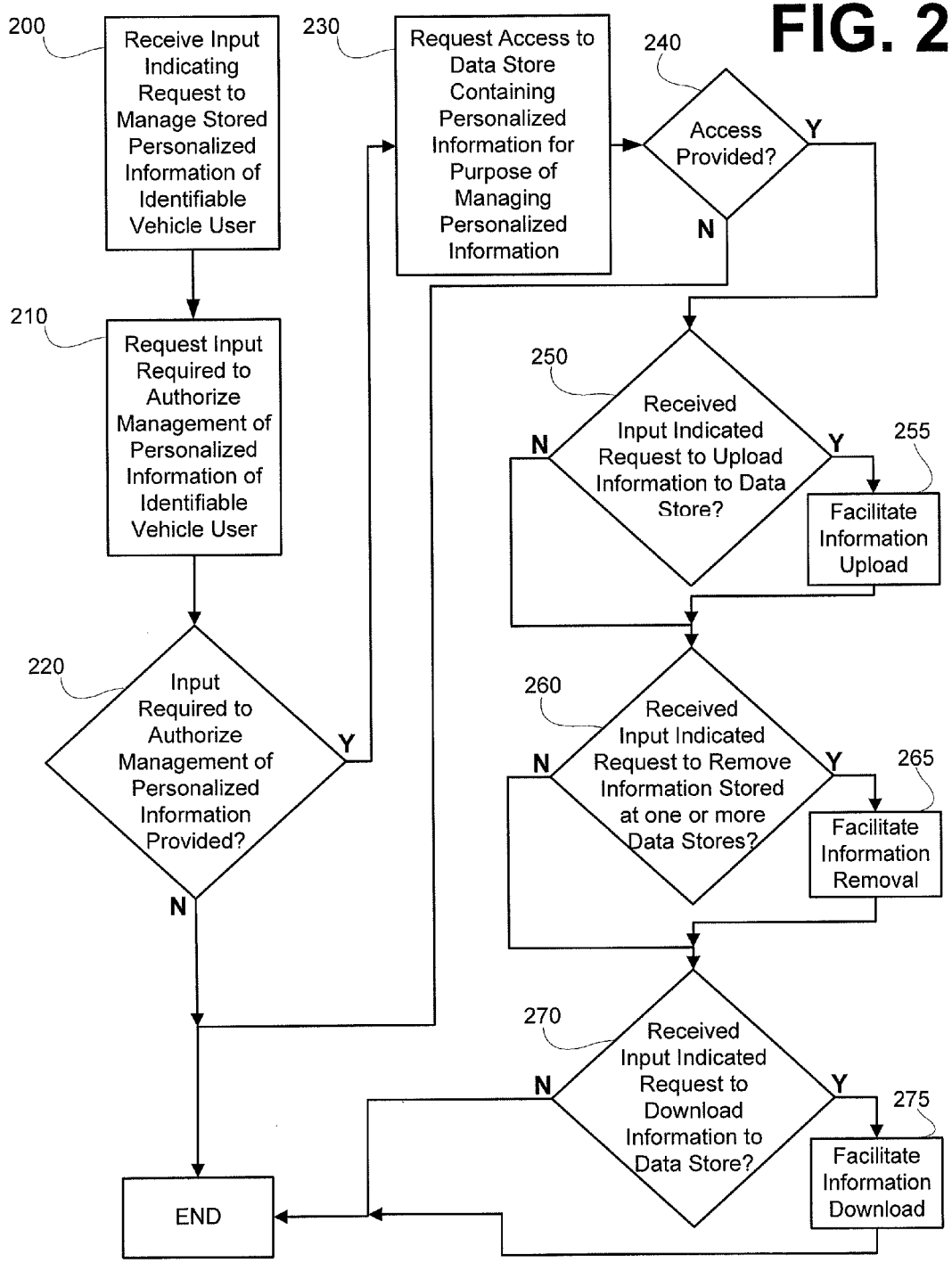
FIG. 2 is a flow diagram illustrating a process implemented by a computerized communication device for managing personalized data of a vehicle user.

FIG. 2 is a flow diagram illustrating a process implemented by a computerized communication device distinct from the hardware of the vehicle 102 (e.g. one of the communication devices 166A and 166B) for managing personalized data of a subscriber of a TSP who is also a past, current, or potential user of the vehicle 102. In the flow diagram depicted in FIG. 2, it is assumed that the computerized communication device implementing the process for managing personalized data of the subscriber of the TSP is the communication device 166A. Each of the steps described in FIG. 2 can be executed by the communication device 166A by way of, e.g., a software application executing at the communication device 166A. However, in alternative implementations, the computerized communication device implementing a process for managing personalized information of the subscriber can be, e.g. the telematics unit 114 of the vehicle 102 or the personalized vehicle user data control module 180. In such alternative implementations, the telematics unit 114 can implement the process for managing personalized information by way of an application executing on the telematics unit 114, e.g. an application being executed by the electronic processing device 128.

At step 200, the communication device 166A receives input indicating a request to manage personalized information of the subscriber of the TSP, i.e. an identifiable vehicle user (whether past, current, or potential). The communication device 166A receives the input at step 200 via a human machine interface (HMI) that it provides. For example, the HMI can be a touch screen of a smart phone configured with one or more elements that can be utilized by a user to input information to the communication device 166A. In some implementations, the elements included in the HMI provided by the communication device 166A at step 200 include elements that call for the production of one or more additional elements at which information pertaining to the management of personalized subscriber data can be input by a user of the communication device 166A and received and parsed by the communication device 166A.

For example, the HMI provided by the communication device 166A at step 200 can include elements that provide for entry of requests for the management of personalized subscriber data pertaining to any one or more of home, mobile, or business telephone numbers associated with the subscriber, a history of geographic locations that the subscriber has visited as reported by a vehicle navigation system, one or more codes for garage doors at residences or business to which the subscriber has access, identification information for one or more smart phones or other computerized devices associated with the subscriber, application data for any of a number of processor executable applications installed on the telematics unit of a vehicle at the request of the subscriber, data collected by one or more electronic control units (ECUs) of a vehicle that is indicative of a driving mode preferred by the subscriber, radio station presets corresponding to various geographical regions as established by the subscriber, seat position information selected by the subscriber, and information corresponding to the registration of the subscriber with the TSP that operates the OCC 108. The elements provided by the communication device 166A at step 200 can further include a element that requests information identifying one or more vehicles, such as the vehicle 102, at which subscriber personalized data to be managed is located or to which subscriber personalized data corresponds. The personalized information of the subscriber to which the request pertains can be maintained by a data structure such as the example data structure depicted in FIG. 6, which is discussed herein below.

In some implementations, the HMI provided by the communication device 166A at step 200 includes an element that allows a user to select an option to remove all personalized vehicle user information having particular characteristics. The characteristics can include, for example, being stored at a particular location (e.g. at the telematics unit 114 or the personalized vehicle user data control module 180 of the vehicle 102) and being associated with a particular subscriber (e.g. data populating a field of a data structure that stores an identifier for the particular subscriber). In such implementations, the HMI provided by the communication device 166A at step 200 may also include elements for the input, by a user, of a selection of a vehicle from which all personalized vehicle user information should be removed, of a selection of a subscriber, and of authentication and/or verification information. In such implementations where the HMI provided at step 200 includes an element that allows a user to select an option to remove all personalized vehicle user information having particular characteristics, the process will bypass steps 250, 255, and 260 (described below) and proceed directly to step 265.

At step 210, the communication device 166A requests input from a user that must be provided to enable the communication device 166A to authorize the management of the subscriber's personalized information. For example, at step 210 the communication device 166A can provide an HMI that includes a prompt for the entry of a password, code, or other key that has been previously established. For example, the communication device 166A can, prior to step 200, establish such a key that is required to be provided by a user as a condition precedent for the communication device 166A to facilitate management of personalized subscriber data. In various implementations, the request of input from a user in order to authorize management of the subscriber's personalized information (as included in step 210 of the flow diagram illustrated in FIG. 2) can occur prior to the request of input from a user that indicates a request to manage the subscriber's personalized information (as included in step 200 of the flow diagram illustrated in FIG. 2). In yet other implementations, the actions described in steps 200 and 210 of the flow diagram illustrated in FIG. 2 can be commingled. In other words, requests for information necessary for authorization of personalized information management can occur both before and after requests for specific actions that constitute management of personalized information and vice versa.

At step 220, the process determines whether or not the input required to authorize the communication device 166A to manage the subscriber's personalized information was provided at step 210. For example, the process determines whether or not the information entered in response to the prompt for authorization information issued at step 210 matches a previously stored authorization key. If the authorization information received in response to the prompt issued at step 210 does not match the pre-stored authorization key, the process ends. In some implementations, the process can provide an HMI element that indicates a particular reason or particular category of reasons for why the process was ended. For example, the process can provide an HMI element that informs a user that incorrect authorization information was provided or that the provided authorization information does not match pre-stored authorization information.

If the input required to authorize the communication device 166A to manage the subscriber's personalized information was provided at step 220, the process proceeds to step 230 where a request to execute data management operations is sent to a data store containing personalized information for the purpose of managing the personalized information is made. For example, a request to execute data management operations can be sent to the databases 146 at the OCC 108 of the TSP at step 230. Similarly, a request to execute data management operations can be sent to the electronic memory 130 of the telematics unit 114 of the vehicle 102 at step 230 or to the personalized vehicle user data control module 180. If the input received at step 200 indicates a request to manage personalized information of the subscriber of the TSP that is located at more than one data store, separate requests may be sent at step 230 to each data store at which such information is stored. For example, separate requests may be sent at step 230 for the execution of data management operations at both the databases 146 of the OCC 108 of the TSP and the electronic memory 130 of the telematics unit 114 of the vehicle 102.

In some implementations, a request to execute data management operations sent to a data store containing personalized information for the purpose of managing the personalized information is a request for safe passage of signals transmitted to the data store or a processor at the data store. In such implementations, the signals specify certain actions that constitute management of personalized subscriber information. In other implementations, the request to execute data management operations at the data store containing personalized information for the purpose of managing the personalized information includes a request to remotely execute an information management application at the data store. For example, in such implementations the communication device 166A can be able to remotely execute an application at the databases 146 of the OCC 108, at the telematics unit 114 of the vehicle 102, or at the personalized vehicle user data control module 180. In such implementations, the communication device 166A executes a server-side application that communicates with a client-side application at the databases 146 of the OCC 108, at the telematics unit 114 of the vehicle 102, or at the personalized vehicle user data control module 180. The request to execute data management operations at the data store at step 230 can include a data structure, such as the example data structure depicted in FIG. 5 (which is discussed herein below), that includes information pertaining to the request. Alternatively, the request to execute data management operations at the data store at step 230 may not be accompanied by such a data structure. In implementations where such a data structure does not accompany the request to execute data management operations at the data store at step 230, such a data structure can be transmitted by the communication device 166A during a subsequent step of the process depicted in FIG. 2.

At step 240, the process determines whether or not to the request to execute data management operations at the data store containing personalized information for the purpose of managing the personalized information was accepted. If the request was not accepted, the process can end. In some implementations, the process can provide output capable of being comprehended by a user that indicates the reason why the request to execute data management operations at the data store was not accepted. For example, in some implementations, a request to execute data management operations at a data store located at the vehicle 102 will not be provided unless a vehicle key is communicatively connected to the vehicle 102 (e.g. a vehicle key is in the ignition of the vehicle 102 or a radio-frequency vehicle key is located within the interior of the vehicle 102). In such implementations, if a request to execute data management operations at the data store located at the vehicle 102 is denied because the vehicle key is not communicatively connected to the vehicle 102, the process can output a message that informs the user that the request to manage information was denied because a vehicle key is not activated.

If the process determines that the request to execute data management operations at the data store containing the personalized subscriber information was accepted, the process proceeds to step 250 where it determines whether or not input has been received that indicates a request to upload subscriber information to a data store. If a request to upload subscriber information to a data store was received, the process proceeds to step 255. If such a request was not received, the process proceeds to step 260. Such a request can be received, e.g., at step 200. However, in some implementations the request to upload subscriber information, which is depicted as part of step 200 in the flow diagram depicted in FIG. 2, can occur after all or part of various other steps illustrated in the process depicted by FIG. 2.

At step 255, which is executed if the process determines that input indicating a request to upload subscriber information to a data store was received, the process facilitates an information upload. For example, the process can facilitate the uploading of certain personalized subscriber information identified by the input received at step 200 and stored at the electronic storage media 130 of the telematics unit 114 to the databases 146 of the OCC 108. Alternatively, the process can facilitate the uploading of certain personalized subscriber information identified by the input received at step 200 and stored at electronic, processor-readable media of the communication device 166A to the databases 146 of the OCC 108. The request for an information upload at step 255 can include or be accompanied by a data structure, such as the data structure depicted in FIG. 5 (which is discussed herein below), that includes information pertaining to the request.

At step 260 the process determines whether or not input has been received that indicates a request to remove subscriber information from a data store. If a request to remove subscriber information from a data store was received, the process proceeds to step 265. If such a request was not received, the process proceeds to step 270. Such a request can be received, e.g., at step 200. However, in some implementations the request to remove subscriber information, which is depicted as part of step 200 in the flow diagram depicted in FIG. 2, can occur after all or part of various other steps illustrated in the process depicted by FIG. 2. In implementations where the HMI provided by the communication device 166A at step 200 includes an element that allows a user to select an option to remove all personalized vehicle user information having particular characteristics, selection of that option by the user will cause the process to proceed directly from step 230 to step 265.

At step 265, which is executed if the process determines that input indicating a request to remove subscriber information from a data store was received, the process facilitates an information removal. The process can facilitate an information removal at step 265 by transmitting a request to remove subscriber information at step 265 that includes or is accompanied by a data structure, such as the data structure depicted in FIG. 5 (which is discussed herein below), that includes information pertaining to the request. The process can request that certain personalized subscriber information identified by the input received at step 200 and stored at the electronic storage media 130 of the telematics unit 114 be removed from the electronic storage media 130 of the telematics unit 114. For example, the process can request that phone numbers, contact information, text messages, email addresses, and call information be erased from the electronic storage media 130 of the telematics unit 114 or from alternative storage locations of the vehicle 102. The process can also request at step 265 that navigation information collected via the GPS based chipset/component 132 and recorded at the electronic storage media 130 be erased. A variety of additional subscriber personalized information can be stored at the electronic storage media 130 of the telematics unit 114 or from alternative storage locations of the vehicle 102. Such personalized information can include but is not limited to garage door codes stored at a garage door opener module, information allowing the pairing of a smart phone or other computerized device with the vehicle 102, information collected by one or more of the vehicle sensors 135 and stored at the vehicle 102, radio preset information, vehicle seat configuration and positioning preset information, and information pertaining to registration with a TSP. Information stored by one or more applications downloaded by the subscriber to the vehicle 102, such as application preferences, application user profiles, and application registration information, can also be removed at step 265. Furthermore, applications themselves can be removed at step 265.

In some implementations, at step 265 a command input for activating a control program coupled to the telematics unit 114 or to the personalized vehicle user data control module 180 can be utilized. The command input is responsive, e.g., to user input entered at the communication device 166A or at the vehicle 102. The command input can be triggered, e.g., by the determination made at step 260 and can activate the control program which triggers one or more data deletion functions. For example, the control program, which can be stored, e.g., at the telematics unit 114 or at the personalized vehicle user data control module 180, can trigger a first data deletion function that is included in the telematics unit 114 or the personalized vehicle user data control module 180 and can also trigger a second data deletion function that is included in one of the modules of the in-vehicle network that includes the vehicle sensor interface modules 134 and the additional vehicle modules 184. The first and second data deletion functions can be operable to delete, or erase, personalized vehicle user data stored at data structures located at the telematics unit 114/personalized vehicle user data control module 180 and located at one of the vehicle sensor interface modules 134 and the additional vehicle modules 184, respectively. In addition, the control program can also trigger a third data deletion function included in a processor readable memory of the vehicle 102 or elsewhere (e.g. the databases 146 of the OCC 108) and additional data deletion functions included in processor readable memory of the vehicle 102 or elsewhere.

In implementations where the HMI provided by the communication device 166A at step 200 includes an element that allows a user to select an option to remove all personalized vehicle user information having particular characteristics, the process may search for any personalized subscriber information located, e.g., in the electronic storage media 130 of the telematics unit 114. For example, when a user selects the option to remove all personalized vehicle user information that is stored at a particular vehicle (e.g. when selling the vehicle), the process may search for all information stored at any one of various locations within the vehicle 102 at step 265. Specifically, the process may search, at step 265, for any personalized subscriber information located anywhere in the electronic storage media 130 of the telematics unit 114 and at any of the vehicle sensor interface modules 134 and additional vehicle modules 184 of the in-vehicle network and remove any such information it finds.

In some implementations, at step 265 the process can request that vehicle power or vehicle battery power be cycled to one or more data stores in order to effect the removal of subscriber personalized information from the data store. For example, the process can request that power to a garage door opener module by cycled off for a predetermined period of time in order to erase any information pertaining to garage door codes associated with a particular subscriber. The predetermined period of time can be controlled by an RC circuit connected to the module at which the personalized information is stored, e.g. the garage door opener module. Similarly, the process can request that power to one or more electronic control units that have local electronic storage media at which subscriber personalized information is located be cycled off in order to remove the personalized information.

At step 270 the process determines whether or not input has been received that indicates a request to download subscriber information to a data store. If a request to download subscriber information to a data store was received, the process proceeds to step 275. If such a request was not received, the process ends. In the event that the process ends after step 270, the process can provide user-intelligible output that indicates why the process has ended. For example, the process can provide output that states "requested management of personalized information complete." A request to download subscriber information to a data store can be received, e.g., at step 200. However, in some implementations the request to upload subscriber information, which is depicted as part of step 200 in the flow diagram depicted in FIG. 2, can occur after all or part of various other steps illustrated in the process depicted by FIG. 2.

At step 275, which is executed if the process determines that input indicating a request to download subscriber information to a data store was received, the process facilitates an information download. The request to download subscriber information at step 275 can include or be accompanied by a data structure, such as the data structure depicted in FIG. 5 (which is discussed herein below), that includes information pertaining to the request. For example, the process can request that certain personalized subscriber information identified by the input received at step 200 and stored at the databases 146 of the OCC 108 be downloaded to the electronic storage media 130 of the telematics unit 114. In this manner, a subscriber can download personalized information stored at the OCC 108 to a vehicle that has not previously been used by the subscriber or that has been used by a different user in the time since the subscriber last used the vehicle.

In implementations where the HMI provided by the communication device 166A at step 200 includes an element that allows a user to select an option to remove all personalized vehicle user information having particular characteristics, the process may facilitate an upload of any personalized subscriber information identified and removed at step 265. For example, when a user selects the option to remove all personalized vehicle user information that is stored at a particular vehicle (e.g. when selling the vehicle), the process may search for all information stored at any one of various locations within the vehicle 102 at step 265 and trigger a download of such information to the databases 146 of the OCC 108 at step 275 prior to removing such information from the electronic storage media 130 of the telematics unit 114 at step 265.

At the completion of step 275, the process ends. At the conclusion of step 275, the process can provide user-intelligible output that indicates why the process has ended. For example, the process can provide output that states "requested management of personalized information complete." The flow diagram depicted in FIG. 2 is only an example and alternative implementations may not include each and every step of the flow diagram depicted in FIG. 2 and can also include additional steps not included in FIG. 2. Similarly, alternative implementations can execute various routines and actions described in certain steps of the flow diagram depicted in FIG. 2 in various sequences that differ from the sequence described in FIG. 2.

Figure 3:
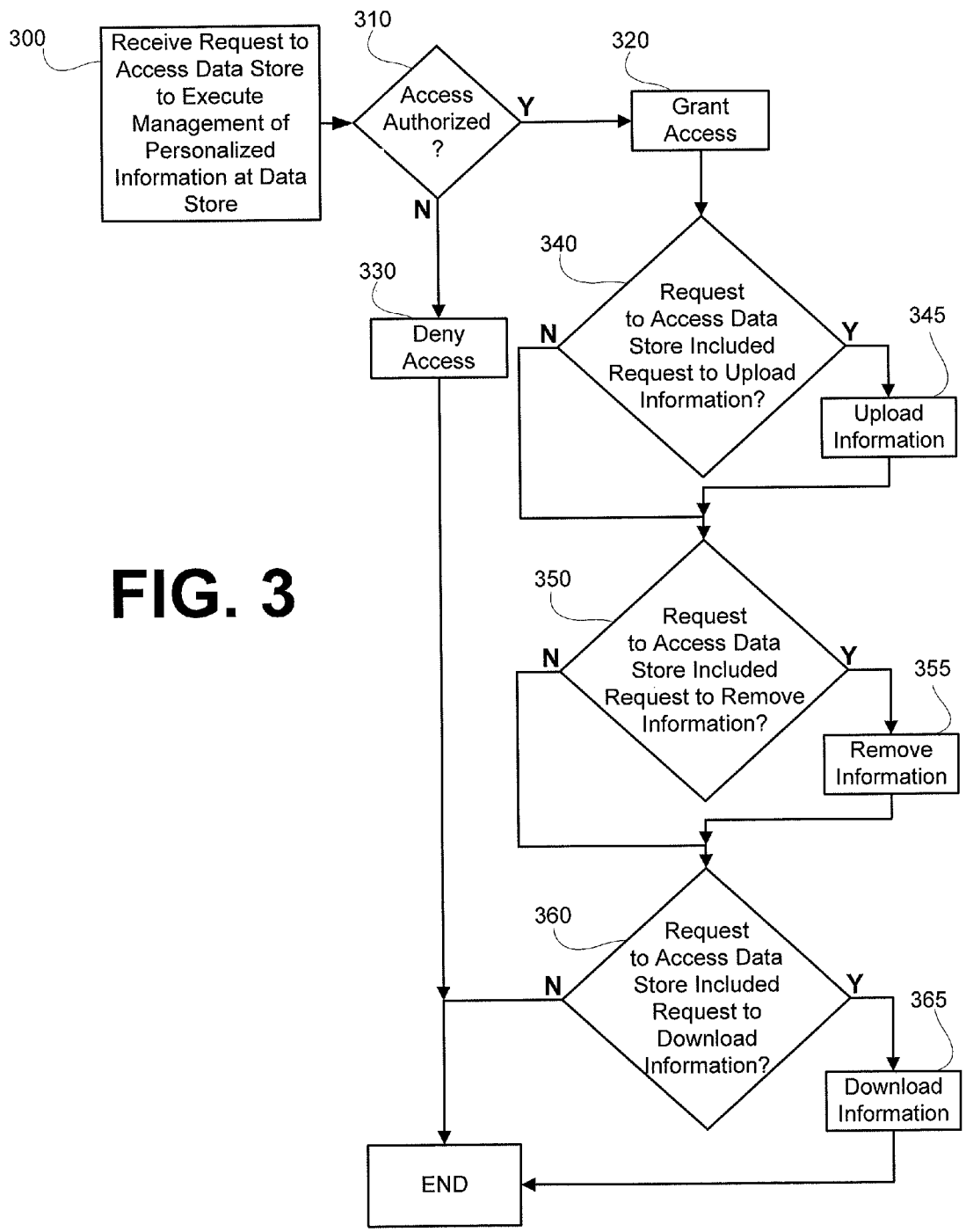
FIG. 3 is a flow diagram illustrating a process implemented by an operations control center of a telematics service provider for managing personalized data of a vehicle user.

FIG. 3 is a flow diagram illustrating a process implemented by the OCC 108 for managing personalized data of a vehicle user. The process depicted in FIG. 3 can be implemented by the OCC 108 by way of, e.g., an application executing on the servers 144.

At step 300, the OCC 108 receives a request to access a data store to execute the management of personalized information located at the data store. For example, the OCC 108 can receive a request for access to the databases 146 from one of the communication devices 166A and 166B. The OCC 108 can also receive a request for access to the databases 146 from the vehicle 102. Such a request can originate at the telematics unit 114 or at the personalized vehicle user data control module 180. The request received by the OCC 108 at step 300 to access a data store to execute the management of personalized information located at the data store can include or be accompanied by a data structure, such as the data structure depicted in FIG. 5 (which is discussed herein below), that includes information pertaining to the request. Alternatively, if the request received by the OCC 108 at step 300 to access a data store to execute the management of personalized information located at the data store is not accompanied by a data structure, the OCC 108 can subsequently request such a data structure from, e.g., one of the communication devices 166A and 166B. In some implementations, the request received by the OCC 108 at step 300 is a request to allow transmission of signals to the data store or a processor at the data store. In such implementations, the signals specify certain actions that constitute management of personalized subscriber information. In other implementations, the request received by the OCC 108 at step 300 is a request to remotely control the execution of an information management application at the data store. For example, one of the communication devices 166A and 166B can be able to remotely control the execution of an application at the databases 146 of the OCC 108, at the telematics unit 114 of the vehicle 102, or at the personalized vehicle user data control module 180. In such implementations, the communication device 166A or 166B executes a server-side application that communicates with a client-side application at the databases 146 of the OCC 108, at the telematics unit 114 of the vehicle 102, or at the personalized vehicle user data control module 180.

At step 310, the process determines whether or not access to the data store containing personalized information for the purpose of managing the personalized information is authorized. If the access to the data store is not authorized, the process denies access at step 330 and then ends. For example, in some implementations, access to a data store located at the vehicle 102, e.g. electronic storage media 130, is not authorized unless a vehicle key is communicatively connected to the vehicle 102 (e.g. a vehicle key is in the ignition of the vehicle 102 or a radio-frequency vehicle key is located within the interior of the vehicle 102). If however the process determines that access to the data store containing the personalized subscriber information is authorized, the process proceeds to step 320 where it grants access to the data store. At step 320, the process can also request a data structure, such as the data structure depicted in FIG. 5, that includes data pertaining to the management of subscriber information.

At step 340 the process determines whether or not a request to upload subscriber information to a data store was received. If a request to upload subscriber information to a data store was received, the process proceeds to step 345. If such a request was not received, the process proceeds to step 350. Such a request can be received, e.g., at step 300. However, in some implementations the request to upload subscriber information, which is depicted as part of step 300 in the flow diagram depicted in FIG. 3, can occur after all or part of various other steps illustrated in the process depicted by FIG. 3.

At step 345, which is executed if the process determines that a request to upload subscriber information to a data store was received, the process performs an information upload. For example, OCC 108 can request information identified by the request received at step 300 from the electronic storage media 130 of the telematics unit 114. Upon receipt of such information, the OCC 108 can store the received information at the databases 146. The information can be stored in a data structure such as the data structure depicted in FIG. 6, described herein below.

At step 350 the process determines whether or not a request to remove subscriber information from a data store was received. If a request to remove subscriber information from a data store was received, the process proceeds to step 355. If such a request was not received, the process proceeds to step 360. Such a request can be received, e.g., at step 300. However, in some implementations the request to remove subscriber information, which is depicted as part of step 300 in the flow diagram depicted in FIG. 3, can occur after all or part of various other steps illustrated in the process depicted by FIG. 3.

At step 355, which is executed if the process determines that a request to remove subscriber information from a data store was received, the OCC 108 requests an information removal or allows transmission of signals from one of the communication devices 166A and 166B that call for the removal of personalized information. For example, the request received at 300 can include a request to remove certain personalized subscriber information stored at the electronic storage media 130 of the telematics unit 114 be removed from the databases electronic storage media 130 of the telematics unit 114. The information removal requested at step 355 can be executed in any of the manners specified in conjunction with step 265 of the process illustrated in FIG. 2. Similarly, the types of information that can be removed at step 355 can be any of the types of information that were specified in conjunction with step 265 of the process illustrated in FIG. 2.

Specifically, in some implementations, at step 355 a command input for activating a control program coupled to the telematics unit 114 or to the personalized vehicle user data control module 180 can be utilized. The command input is responsive to, e.g., user input entered at the communication device 166A or at the vehicle 102. The command input can be triggered, e.g., by the determination made at step 350 and can activate the control program which triggers one or more data deletion functions. For example, the control program, which can be stored, e.g., at the telematics unit 114 or at the personalized vehicle user data control module 180, can trigger a first data deletion function that is included in the telematics unit 114 or the personalized vehicle user data control module 180 and can also trigger a second data deletion function that is included in one of the modules of the in-vehicle network that includes the vehicle sensor interface modules 134 and the additional vehicle modules 184. The first and second data deletion functions can be operable to delete, or erase, personalized vehicle user data stored at data structures located at the telematics unit 114/ personalized vehicle user data control module 180 and located at one of the vehicle sensor interface modules 134 and the additional vehicle modules 184, respectively. In addition, the control program can also trigger a third data deletion function included in a processor readable memory of the vehicle 102 or elsewhere (e.g. the databases 146 of the OCC 108) and additional data deletion functions included in processor readable memory of the vehicle 102 or elsewhere.

At step 360 the process determines whether or a request to download subscriber information to a data store has been received. If a request to download subscriber information to a data store was received, the process proceeds to step 365. If such a request was not received, the process ends. A request to download subscriber information to a data store can be received, e.g., at step 300. However, in some implementations the request to upload subscriber information, which is depicted as part of step 300 in the flow diagram depicted in FIG. 3, can occur after all or part of various other steps illustrated in the process depicted by FIG. 3.

At step 365, the OCC 108 pushes information to a data store. For example, the OCC 108 can identify certain personalized subscriber information identified in the request received at step 300 and stored at the databases 146 and push the identified subscriber information to the electronic storage media 130 of the telematics unit 114. The personalized subscriber information can be stored in a data structure such as the data structure depicted in FIG. 6, described herein below, which can be located at both the databases 146 and the electronic storage media of 130 of the telematics unit 114. In this manner, the OCC 108 can transfer a subscriber's personalized information to a vehicle that has not previously been used by the subscriber or that has been used by a different user in the time since the subscriber last used the vehicle. At the completion of step 365, the process ends. The information can be stored in a data structure such as the data structure depicted in FIG. 6, described herein below.

The flow diagram depicted in FIG. 3 is only an example and alternative implementations may not include each and every step of the flow diagram depicted in FIG. 3 and may also include additional steps not included in FIG. 3. Similarly, alternative implementations may execute various routines and actions described in certain steps of the flow diagram depicted in FIG. 3 in various sequences that differ from the sequence described in FIG. 3. For example, in some implementations the request to access a data store to execute the management of personalized information located at the data store may indicate that the request pertains only to the removal of personalized information. In such implementations, the process may bypass certain steps illustrated in FIG. 3, e.g. steps 340 and 345.

Figure 4:
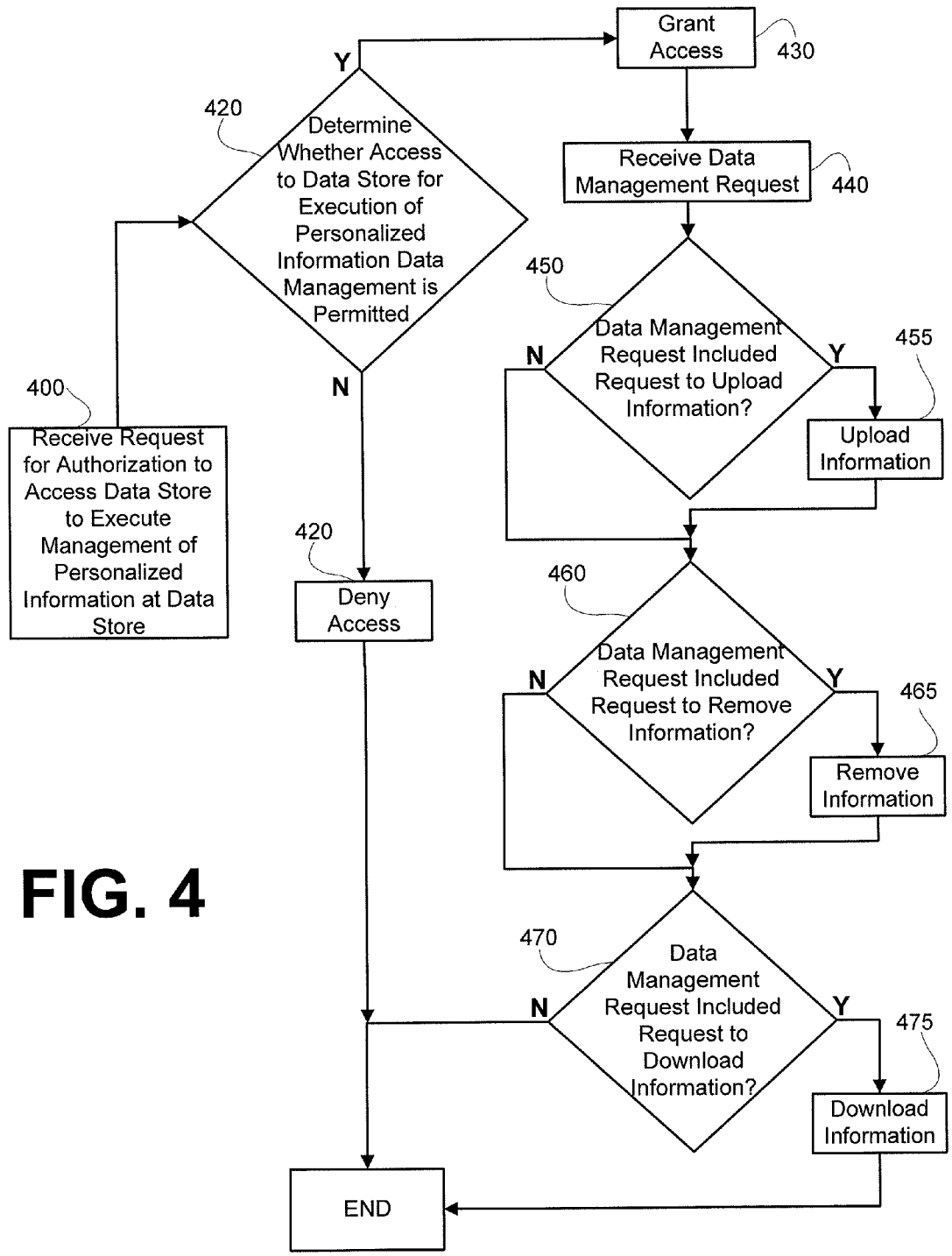
FIG. 4 is a flow diagram illustrating a process implemented by a telematics unit of a vehicle for managing personalized data of a vehicle user.

FIG. 4 is a flow diagram illustrating a process implemented by a telematics unit of a vehicle for managing personalized data of a vehicle user. The process depicted in FIG. 4 can be implemented by the OCC 108 by way of, e.g., an application executing on the servers 144.

At step 400, the telematics unit 114 receives a request for authorization to access a data store to execute the management of personalized information located at the data store. For example, the telematics unit 114 can receive a request for authorization to access the electronic storage media 130 from the OCC 108 or from one of the communication devices 166A and 166B. The request for access to the data store received at step 400 can include or be accompanied by a data structure, such as the example data structure depicted in FIG. 5 (which is discussed herein below), that includes information pertaining to the request. Alternatively, the request for access to the data store received at step 400 may not be accompanied by such a data structure. In implementations where such a data structure does not accompany the request for access to the data store at step 400, such a data structure can be received by the telematics unit 114 during a subsequent step of the process depicted in FIG. 4.

At step 410, the process determines whether or not access to the data store containing personalized information for the purpose of managing the personalized information is permitted. If the access to the data store is not authorized, the process denies access at step 420 and then ends. For example, in some implementations, access to a data store located at the vehicle 102, e.g. electronic storage media 130, is not authorized unless a vehicle key is communicatively connected to the vehicle 102 (e.g. a vehicle key is in the ignition of the vehicle 102 or a radio-frequency vehicle key is located within the interior of the vehicle 102). If however the process determines that access to the data store containing the personalized subscriber information is authorized, the process proceeds to step 430 where it grants access to the data store.

At step 440 the process receives a data management request. The data management received at step 400 can include or be accompanied by a data structure, such as the example data structure depicted in FIG. 5 (which is discussed herein below), that includes information pertaining to the request. At step 450, the process determines whether or not a request to upload subscriber information to a data store was received. If a request to upload subscriber information to a data store was received, the process proceeds to step 455. If such a request was not received, the process proceeds to step 460.

At step 455, which is executed if the process determines that a request to upload subscriber information to a data store was received, the process performs an information upload. For example, the telematics unit 114 can push information stored at the electronic storage media 130 to the OCC 108 or can respond to a request for data from the OCC 108 by transmitting the requested data (which was stored at the electronic storage media 130 or at another electronic storage medium of the vehicle 102) to the OCC 108. The information stored at the electronic storage media 130 or at another storage medium of the vehicle 102 can be stored in a data structure such as the data structure depicted in FIG. 6, described herein below.

At step 460 the process determines whether or not a request to remove subscriber information from a data store was received. If a request to remove subscriber information from a data store was received, the process proceeds to step 465. If such a request was not received, the process proceeds to step 470. At step 465, which is executed if the process determines that a request to remove subscriber information from a data store was received, the telematics unit 114 requests an information removal or allows transmission of signals from one of the communication devices 166A and 166B that call for the removal of personalized information. The information removal executed at step 465 can be executed in any of the manners specified in conjunction with step 265 of the process illustrated in FIG. 2. Similarly, the types of information that can be removed at step 465 can be any of the types of information that were specified in conjunction with step 265 of the process illustrated in FIG. 2.

Specifically, in some implementations, at step 465 a command input for activating a control program coupled to the telematics unit 114 or to the personalized vehicle user data control module 180 can be utilized. The command input is responsive to, e.g., user input entered at the communication device 166A or at the vehicle 102. The command input can be triggered, e.g., by the determination made at step 460 and can activate a control program which triggers one or more data deletion functions. For example, the control program, which can be stored, e.g., at the telematics unit 114 or at the personalized vehicle user data control module 180, can trigger a first data deletion function that is included in the telematics unit 114 or the personalized vehicle user data control module 180 and can also trigger a second data deletion function that is included in one of the modules of the in-vehicle network that includes the vehicle sensor interface modules 134 and the additional vehicle modules 184. The first and second data deletion functions can be operable to delete, or erase, personalized vehicle user data stored at data structures located at the telematics unit 114/personalized vehicle user data control module 180 and located at one of the vehicle sensor interface modules 134 and the additional vehicle modules 184, respectively. In addition, the control program can also trigger a third data deletion function included in a processor readable memory of the vehicle 102 or elsewhere (e.g. the databases 146 of the OCC 108) and additional data deletion functions included in processor readable memory of the vehicle 102 or elsewhere.

At step 470 the process determines whether a request to download subscriber information to a data store has been received. If a request to download subscriber information to a data store was received, the process proceeds to step 475. If such a request was not received, the process ends. At step 475, the telematics unit 114 receives information from the OCC 108 and stores the information at a data store of the vehicle 102, e.g. the electronic storage media 130. The information stored at the data store of the vehicle 102 can be stored in a data structure such as the data structure depicted in FIG. 6, described herein below. At the completion of step 475, the process ends.

The flow diagram depicted in FIG. 4 is only an example and alternative implementations may not include each and every step of the flow diagram depicted in FIG. 4 and may also include additional steps not included in FIG. 4. Similarly, alternative implementations may execute various routines and actions described in certain steps of the flow diagram depicted in FIG. 4 in various sequences that differ from the sequence described in FIG. 4. For example, in some implementations the request to access a data store to execute the management of personalized information located at the data store received at step 400 may indicate that the request pertains only to the removal of personalized information. In such implementations, the process may bypass certain steps illustrated in FIG. 3, e.g. steps 450 and 455.

Figure 5:
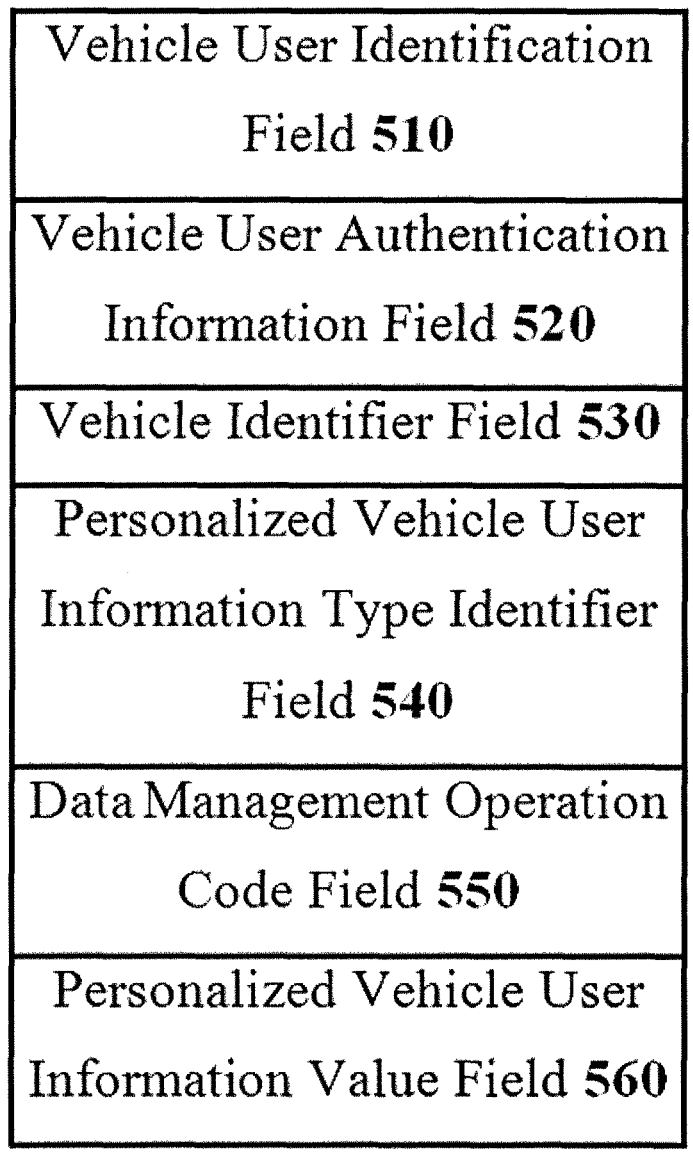
FIG. 5 is an example set of fields of a data structure transmitted in connection with a request to manage personalized data of a vehicle user.

FIG. 5 is an example set of fields of a data structure transmitted in connection with a request to manage personalized data of a vehicle user. Data structures transmitted in connection with a request to manage personalized data of a vehicle user may include, by way of example, vehicle user identification field 510, vehicle user authentication information field 520, vehicle identifier field 530, personalized vehicle user information type identifier field 540, data management operation code field 550, and personalized vehicle user information value field 560. A data structure transmitted in connection with a request to manage personalized data of a vehicle user may include multiple personalized vehicle user information type identifiers in the personalized vehicle user information type identifier 540, multiple data management operation codes in the data management operation code field 550, and multiple values for personalized vehicle user information types in the personalized vehicle user information value field 560. Although not depicted in FIG. 5, individual entries in the various fields of the data structure depicted in FIG. 5 may include a connector value that establishes link between entries in different fields. For example, an entry in the personalized vehicle user information type identifier field 540 may include a connector value that indicates it is linked to a particular data management operation code having the same connector value in the data management operation code field 550 and also linked to a particular data value in the personalized vehicle user information value field 560. The data structure depicted in FIG. 5 is merely an example and alternative data structures that omit particular fields depicted in FIG. 5 or include additional fields not depicted in FIG. 5 are also contemplated herein.

FIG. 6 is an example set of fields of a data structure storing personalized data of a vehicle user. The data structure depicted in FIG. 6 includes general categories of vehicle settings and personal information that may be stored at any one or more of the OCC 108, the vehicle 102, and one of the communication devices 166A and 166B. The data structure depicted in FIG. 6 includes a variety of personalized vehicle settings and personalized user information. The personalized vehicle settings include radio presets (channels/stations), audio settings (e.g., balance, bass, treble, mid-range, fade), seat positioning (forward/back, seat incline, back incline), mirror positioning, climate control settings, Metric/Imperial measurements, etc. The personalized user information includes garage door codes, voicemail messages, phone numbers (called/received caller lists), navigation destinations, email messages (received/sent), email contacts, hands-free call minutes, Internet browsing history, multimedia content (music, playlists, videos, podcasts, etc.), application programs/applets and application data, Bluetooth profiles, etc. The data structure depicted in FIG. 6 is merely an example and alternative data structures that omit particular fields depicted in FIG. 6 or include additional fields not depicted in FIG. 6 are also contemplated herein. The data structure depicted in FIG. 6 may be stored at a single location or distributed across multiple locations. For example, a portion of the data structure depicted in FIG. 6 can be stored at the databases 146 of the OCC 108 while another portion of the data structure depicted in FIG. 6 is stored at the telematics unit 114 of the vehicle 102. Similarly, multiple copies of all or a portion of the data structure depicted in FIG. 6 can be stored at multiple locations. Various fields of the data structure depicted in FIG. 6 can also include a pointer to a field of a data structure stored at a different location. For example, a data structure stored at the vehicle 102 may include a pointer to a data structure stored at the OCC 108.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit 114 may be carried out according to stored recommendations or applications installed on the telematics unit 114, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for removing a personalized vehicle user information from an electronic storage on a vehicle, the system comprising:

a computerized communication device comprising:
  a first processor; and
  a first processor readable media having stored thereon computer-executable instructions that, when executed by the first processor, facilitate performing a method at the computerized communication device for initiating removing the personalized vehicle user information from the electronic storage on the vehicle, the method comprising:
    displaying a human machine interface (HMI) element that provides an option for requesting removal of the personalized vehicle user information from the electronic storage on the vehicle,
    receiving an indication of a selection of the option for requesting removal of the personalized vehicle user information,
    transmitting using a wireless communication media, in response to the receiving, a request message corresponding to the selection of the option for requesting removal of the personalized vehicle user information from the electronic storage on the vehicle; and a telematics unit located at the vehicle, the telematics unit comprising:
  a second processor; and
  a second processor readable media having stored thereon computer-executable instructions that, when executed by the second processor, facilitate performing a method at the vehicle for executing a received request for removing the personalized vehicle user information from the electronic storage on the vehicle, the method comprising:
    storing, within the electronic storage on the vehicle, the personalized vehicle user information,
    receiving a data removal request, corresponding to the request message transmitted by the computerized communication device, to remove the personalized vehicle user information from the electronic storage, and
    removing, in response to the receiving the data removal request, the personalized vehicle user information from the electronic storage.

2. The system of claim 1, wherein electronic storage on the vehicle comprises a local data store on the telematics unit,
wherein the data removal request received by the telematics unit comprises a request to remove data from data structures containing personalized information, and
wherein removing the personalized vehicle user information comprises removing the data from the local data store.

3. The system of claim 2, wherein removing the personalized vehicle user information data from the local data store comprises disconnecting a power source from the local data store for a period of time.

4. The system of claim 3, wherein the period of time is established by a resistor-capacitor (RC) circuit.

5. The system of claim 1, wherein the computerized communication device is further configured to carry out the further operations of:
  displaying an HMI element that provides a prompt for entry of information required for authorization of personalized information management,
  receiving input in response to the prompt for entry of information required for authorization of personalized information management, and comparing the input received in response to the prompt for entry of information required for authorization of personalized information management with a previously stored authorization key.

6. The system of claim 1, wherein the telematics unit is further configured to carry out the further operation of:
determining that the telematics unit is authorized to remove the personalized vehicle user information data corresponding to an identified telematics service subscriber.

7. The system of claim 6, wherein determining that the telematics unit is authorized to remove the personalized vehicle user information data comprises determining that a vehicle key corresponding to the vehicle is in communicative connection with the vehicle.

8. The system of claim 1, further comprising:
a server comprising:
a third processor; and
a third processor readable media having stored thereon computer-executable instructions that, when executed by the third processor, facilitate performing a method at the server for managing personalized information corresponding to an identified telematics service subscriber, the method comprising:
storing data within a data structure containing personalized information corresponding to the identified telematics service subscriber,
receiving a request from the computerized communication device to manage data representing personalized information corresponding to the identified telematics service subscriber, and
managing the data representing personalized information corresponding to the identified telematics service subscriber.

9. The system of claim 8, wherein the server further comprises a database;
wherein the request received by the server from the computerized communication device to manage data representing personalized information corresponding to the identified telematics service subscriber comprises a request to store data in the data structure containing personalized information at the database, and
wherein managing the data representing personalized information corresponding to the identified telematics service subscriber comprises downloading the data representing personalized information corresponding to the subscriber from the local data store of the telematics unit and storing the downloaded data representing personalized information at the database.

10. The system of claim 8, wherein the server further comprises a database storing data for a data structure containing personalized information;
wherein the request received by the server from the computerized communication device to manage data representing personalized information corresponding to the identified telematics service subscriber comprises a request to upload one or more data structures stored at the database to the telematics unit.

11. A method, which is executed by a system, for removing personalized vehicle user information from an electronic storage on a vehicle, where the system includes a computerized communication device having a first processor configured with a first processor readable media including computer-executable instructions, and a telematics unit located on the vehicle having a second processor configured with a second processor readable media including computer-executable instructions, the first processor and second processor being configured to execute the computer-executable instructions on the first processor readable media and the second processor readable media, respectively to carry out a method comprising:
displaying, by the computerized communication device, a human machine interface (HMI) element that provides an option for requesting removal of the personalized vehicle user information;
receiving, by the computerized communication device, an indication of a selection of the option for requesting removal of the personalized vehicle user information;
transmitting, by the computerized communication device, using a wireless communication media, in response to the receiving, a request message corresponding to the selection of the option for requesting removal of the personalized vehicle user information from the electronic storage on the vehicle; and
storing, by the telematics unit, within the electronic storage on the vehicle, the personalized vehicle user information,
receiving, by the telematics unit, a data removal request, corresponding to the request message transmitted by the computerized communication device, to remove the personalized vehicle user information from the electronic storage, and
removing, by the telematics unit, in response to the receiving the data removal request, the personalized vehicle user information from the electronic storage.

12. The method of claim 11, wherein the transmitting using a wireless communication media the request message comprises transmitting a request to a telematics unit of the vehicle to remove the personalized vehicle user information from a data store located at the telematics unit.

13. The method of claim 12, wherein the request to remove the personalized vehicle user information from the data store located at the telematics unit comprises a request to disconnect a power source from the data store located at the telematics unit.

14. The method of claim 12, wherein the personalized vehicle user information located at the data store located at the telematics unit contains one or more of the group consisting of:
a phone number corresponding to the subscriber,
a garage door code corresponding to the subscriber,
radio preset settings corresponding to the subscriber, and
vehicle seat settings corresponding to the subscriber.

15. The method of claim 11, further comprising transmitting a request to a server to upload data from a data structure storing the personalized vehicle user information at the telematics unit and to store the uploaded data from the data structure at a database.

16. The method of claim 15, wherein a data structure at the telematics unit contains at least one type of information of the group of information types consisting of:
a phone number corresponding to the subscriber,
a garage door code corresponding to the subscriber,
radio preset settings corresponding to the subscriber, and
vehicle seat settings corresponding to the subscriber.

17. The method according to claim 11, wherein the telematics unit is configured to receive an in-vehicle user input.

18. The method according to claim 11, wherein the telematics unit is configured to receive a remote user input.

19. The method according to claim 11, wherein the telematics unit is further coupled to an in-vehicle network, wherein the telematics unit is further configured with a control program to erase personalized vehicle user information, and wherein the telematics unit is configured to activate the control program to erase the personalized vehicle user information.

* * * * *